United States Patent
Shibayama et al.

(10) Patent No.: US 9,512,731 B2
(45) Date of Patent: *Dec. 6, 2016

(54) NI BASED FORGED ALLOY, AND TURBINE DISC, TURBINE SPACER AND GAS TURBINE EACH USING THE SAME

(71) Applicant: MITSUBISHI HITACHI POWER SYSTEMS, LTD., Kanagawa (JP)

(72) Inventors: Takashi Shibayama, Yokohama (JP); Shinya Imano, Yokohama (JP); Hideki Tamaki, Yokohama (JP)

(73) Assignee: Mitsubishi Hitachi Power Systems, Ltd., Yokohama-shi (JP)

(*) Notice: Subject to any disclaimer, the term of this patent is extended or adjusted under 35 U.S.C. 154(b) by 182 days.

This patent is subject to a terminal disclaimer.

(21) Appl. No.: 14/300,255

(22) Filed: Jun. 10, 2014

(65) Prior Publication Data

US 2014/0363297 A1 Dec. 11, 2014

(30) Foreign Application Priority Data

Jun. 10, 2013 (JP) ................................. 2013-122045

(51) Int. Cl.
*C22C 19/05* (2006.01)
*F01D 5/28* (2006.01)
(Continued)

(52) U.S. Cl.
CPC . *F01D 5/28* (2013.01); *C22B 9/18* (2013.01); *C22B 9/20* (2013.01); *C22C 19/05* (2013.01);
(Continued)

(58) Field of Classification Search
CPC .......... C22C 19/055; C22C 19/056; C22F 1/10
See application file for complete search history.

(56) References Cited

U.S. PATENT DOCUMENTS 6,478,897 B1* 11/2002 Izumida ................ C22C 19/055
148/428
8,864,919 B2* 10/2014 Sato ...................... C22C 19/055
148/428
(Continued)

FOREIGN PATENT DOCUMENTS

EP 2 706 126 A1 3/2014
JP 2009-191301 A 8/2009
(Continued)

OTHER PUBLICATIONS

R.T. Holt et al., Impurities and Trace Elements in Nickel-Base Superalloys, International Metals Reviews, Vo. 21, No. 1, Mar. 1976, pp. 1-24.
(Continued)

*Primary Examiner* — Jessee Roe
(74) *Attorney, Agent, or Firm* — Crowell & Moring LLP

(57) ABSTRACT

The Ni based forged alloy has a composition containing, on the basis of mass percent, Al: 0.5 to 1.0%, Cr: 17 to 21%, Fe: 17 to 19%, Nb: 4.5 to 5.5%, Ti: 0.8 to 1.3%, W: 3.0 to 6.0%, B: 0.001 to 0.03%, C: 0.001 to 0.015%, and Mo: 1.0% or less, the balance being Ni and inevitable impurities. The alloy includes carbide grains of the contained elements. The carbide grains have an average grain diameter of 20 μm or less. Thus, a Ni based forged alloy is provided which is excellent in high-temperature fatigue property and has a moderate macrosegregation property.

4 Claims, 3 Drawing Sheets

(51) Int. Cl.
  *C22B 9/18* (2006.01)
  *C22B 9/20* (2006.01)
  *F01D 25/00* (2006.01)

(52) U.S. Cl.
  CPC ........... *C22C 19/056* (2013.01); *F01D 25/005* (2013.01); *F05D 2250/80* (2013.01); *F05D 2300/17* (2013.01); *Y02T 50/671* (2013.01)

(56) References Cited

U.S. PATENT DOCUMENTS

| | | |
|---|---|---|
| 2010/0310411 A1 | 12/2010 | Ohsaki et al. |
| 2012/0141293 A1 | 6/2012 | Sato et al. |
| 2013/0160466 A1 | 6/2013 | Sato et al. |

FOREIGN PATENT DOCUMENTS

| | | |
|---|---|---|
| JP | 2012-117122 A | 6/2012 |
| JP | 2013-129880 A | 7/2013 |

OTHER PUBLICATIONS

EP Search Report of Appln. No. 14171821.3 dated Sep. 19, 2014 in English.

\* cited by examiner

… (1)

NI BASED FORGED ALLOY, AND TURBINE DISC, TURBINE SPACER AND GAS TURBINE EACH USING THE SAME

CLAIM OF PRIORITY

The present application claims priority from Japanese Patent application serial No. 2013-122045, filed on Jun. 10, 2013, the content of which is hereby incorporated by reference into this application.

BACKGROUND OF THE INVENTION

1. Field of the Invention

The present invention relates to a Ni based forged alloy, and a turbine disc, a turbine spacer and a gas turbine each using this alloy, and particularly to a Ni based forged alloy which is excellent in a high-temperature fatigue property, has a moderate macrosegregation property, and enables to control the crystal grains of the alloy and to manufacture a large-sized member of the alloy.

2. Description of Related Art

With a rise in an efficiency of gas turbines, Ni based heat-resistant alloy which has an excellent high-temperature strength has been used for their various members. Ni based heat-resistant alloy contains solute strengthening elements such as W, Mo and Co in a large proportion, and precipitation strengthening elements such as Al, Ti and Nb in a large proportion. These elements contribute intensely to the strength of the alloy. In particular, a γ' phase made of $Ni_3Al$ and a γ" phase made of $Ni_3Nb$ which are precipitation strengthening phases can be precipitated minutely into innumerable regions of a parent phase of the alloy. The precipitation is very effective for improving the alloy in the high-temperature strength. The γ' and γ" phases are stabilized by Al, Ti and Nb. In the design of the high-temperature strength of the Ni based alloy in developments of the alloy, a main attention is paid to a phase stability of these precipitation strengthening phases.

However, as each of these solute strengthening elements and precipitation strengthening elements is added to a material for Ni based alloy in a larger proportion, segregation is more easily caused while the material is solidified. Thus, a large-sized member is less easily produced therefrom. Therefore, the use of the high-strength Ni based alloy is restricted mainly into use for small-sized members such as members for aircrafts, and a rotor blade and a stator blade for a land. For example, alloy 718 has widely been put into practical use as a Ni based forged alloy species having the excellent high-temperature strength by effect of its γ' and γ" phases. However, because of Nb and Mo added thereto, the alloy has a degrading macrosegregation. Thus, when the alloy is used for a relatively large-sized member, it is necessary to use an alloy-producing method involving, for example, the control of the alloy-material-solidifying speed. Furthermore, in the production of a large-sized Ni based alloy primary product having a weight of 5 tons or more, many Ni based alloy species cannot be used since restriction is imposed onto conditions for the solidification in order to continue an operation for the production stably.

According to Japanese Patent Application Laid-Open No. 2012-117122 (Patent Document 1), alloy 718 is improved in macrosegregation property. A cause that the macrosegregation is caused in the alloy would be that a solute element is distributed in a solid-liquid interface of the alloy to cause a change in a density deviation of a melt of the alloy. As any element having a larger atomic weight than the average atomic weight of entire elements in the melt alloy is decreased in the added proportion of the element, the melt density deviation in the alloy tends to be reduced to restrain the segregation. Contrarily, as any element having a smaller atomic weight is increased in the added proportion of the element, the melt density deviation tends to be reduced to restrain the segregation. Thus, according to Patent Document 1, the alloy can attain compatibility between an excellent high-temperature strength and a large ingot manufacturability by balancing its elements different from each other in macrosegregation tendency (Al, Ti, Nb and Mo) with each other, thereby making the melt density deviation close to zero to restrain these elements from segregating.

Another method for improving such an alloy in macrosegregation property is a method of controlling the respective distribution coefficients of its individual elements, as disclosed in Japanese Patent Application Laid-Open No. 2009-191301 (Patent Document 2). An element having a larger or smaller atomic weight than the average atomic weight of entire elements in the alloy melt promotes generation of the macrosegregation further as the distribution coefficient of the element is apart farther from the value "one". However, it has been found out that the distribution coefficient of a specific element is controllable by changing the proportion of an element other than the specific element added to the alloy. According to Patent Document 2, the addition of Co makes the respective distribution coefficients close to the value "one", the respective distribution coefficients being of not only Al, Ti and Nb but also W which promotes the generation of the macrosegregation largely.

SUMMARY OF THE INVENTION

A Ni based forged alloy of the present invention has a composition containing, on the basis of mass percent, Al: 0.5 to 1.0%, Cr: 17 to 21%, Fe: 17 to 19%, Nb: 4.5 to 5.5%, Ti: 0.8 to 1.3%, W: 3.0 to 6.0%, B: 0.001 to 0.03%, C: 0.001 to 0.015%, and Mo : 1.0% or less, the balance being Ni and inevitable impurities. The alloy includes carbide grains of the contained elements. The carbide grains in the alloy have an average grain diameter of 20 µm or less.

The present invention makes it possible to provide a Ni based forged alloy which is excellent in high-temperature fatigue property and has a moderate macrosegregation property. Also, the present invention makes it possible to control the crystal grains of the alloy. Further, the present invention makes it possible to manufacture a large-sized member of the alloy.

DETAILED DESCRIPTION OF THE PREFERRED EMBODIMENTS

Figure 1:
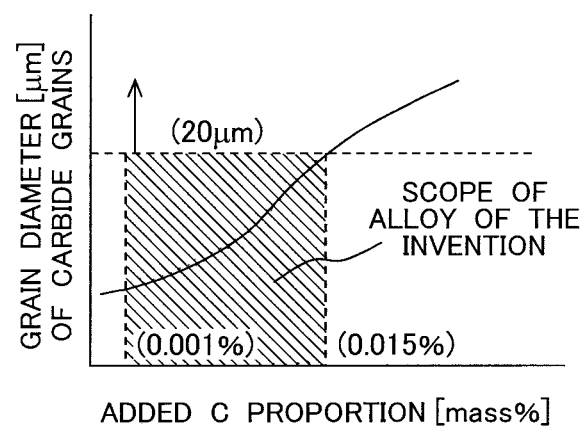
FIG. 1 is a graph showing a relationship between a mass proportion of C added to a Ni based alloy, and an average grain diameter of carbide grains in the alloy.

According to Patent Documents 1 and 2, the adjustment of components of an alloy makes it possible to restrain the generation of the macrosegregation so as to manufacture large ingots when the alloy is forged. The large ingots have their usage limited. The ingots are used for discs of a gas turbine for a power generation, for example. The gas turbine disc is a rotor, and is vibrated while the turbine is operated or when the operation is stopped. Thus, the turbine disc is required to have a high fatigue strength at room temperature and at high temperatures.

An object of the present invention is to obtain the Ni based forged alloy which is excellent in a high-temperature fatigue property and has a moderate macrosegregation property to manufacture a large-sized member of the alloy.

Another object of the present invention is to control crystal grains of the Ni based forged alloy.

Hereinafter, the present invention will be described in detail.

In general, a fatigue strength of an alloy is varied in accordance with not only a strength of the alloy itself but also a microstructure thereof to tend to be higher as its crystal grains are finer. The fatigue strength also depends on a surface state of the alloy material. The fatigue strength is lowered when the surface has defects such as cracks. In particular, a Ni based alloy containing Nb has an enhanced strength since the alloy has a γ" phase precipitated, but Nb bonds to C so that a carbide NbC which is easily oxidized is produced. In the atmosphere having a high temperature, NbC in the surface is oxidized. At this time, Fe and Ni which are contained in the parent metal being in the vicinity of NbC are oxidized so that a part including Nb, Fe and Ni is swelled. When the oxidation into the parent metal advances into a predetermined depth or more, the alloy is cracked by a tensile strength of the surface. In particular, when crystal grain boundaries or an embrittling phase is present close by the carbide, the alloy is easily cracked. The generation of the crack depends intensely on a grain diameter of NbC. As an initial grain diameter of the NbC grains is larger, the alloy tends to be more easily cracked and be lowered in the fatigue strength.

In the alloy of the present invention, the proportion of added C is decreased, thereby decreasing the grain diameter of the NbC grains and reducing the quantity thereof. The decrease in the grain diameter of the NbC grains makes it possible to restrain NbC from being oxidized and swelled, and restrain the advance of the oxidization, so that the alloy can be restrained from being cracked. An average grain diameter of the NbC grains is desirably 20 μm or less, more preferably 10 μm or less. Moreover, the reduction in the precipitation quantity of NbC makes it possible to decrease the number of starting points of the generation of cracks of the alloy. These manners make it possible to restrain the alloy from being lowered in the fatigue strength, and further make an increase in the proportion of Nb atoms not bonding to C to produce the precipitation strengthening phase γ" of Nb with Ni easily. Thus, it can be expected that the alloy is improved in strength.

In general, when a material for the alloy is subjected to bloom forging at high temperature, only a carbide therein takes charge of a part for preventing its crystal grains from coarsening. Thus, when the C proportion is reduced to decrease the carbide, it is feared that the crystal grains coarsen. However, in the alloy of the present invention, a δ phase is precipitated in boundaries of the crystal grains at the time of forging at a low temperature for the finishing thereof. Thus, even if the crystal grain coarsen somewhat at the bloom forging time, the crystal grains can be made fine.

The present invention produces the advantageous effects particularly in the case of a large-sized Ni based forged alloy having a weight of 1 tons or more and produced by use of an electroslag re-melted ingot (an ESR ingot) or vacuum arc re-melted ingot (a VAR ingot) having a diameter of 450 mm or more. The grain diameter of the carbide depends on not only the proportion of added C, but also the cooling speed of the melted ingot. As the diameter of the ingot is larger, the cooling speed is smaller so that segregation is more easily caused. Accordingly, the carbide grains become coarse more easily. It is therefore desired that the proportion of C is made lower as the ingot is larger.

Alloy components in the alloy of the present invention are as follows on the basis of mass percent:

Al: 0.5 to 1.0%, Cr: 17 to 21%, Fe: 17 to 19%, Nb: 4.5 to 5.5%, Ti: 0.8 to 1.3%, W: 3.0 to 6.0%, B: 0.001 to 0.03%, C: 0.001 to 0.015%, and Mo: 1.0% or less. The balance of the alloy consists of Ni and inevitable impurities. The alloy is a Ni based forged alloy which is high in strength. And the macrosegregation in the alloy is unlikely to be generated at the time of casting. Also the alloy has an excellent hot forgeability and has a property that the crystal grains thereof are easily made fine. The alloy is restrained from being cracked from starting points of any carbide therein.

The present invention is an alloy obtained by paying attention to the carbon (C) content by percentage in the alloy described in Patent Document 1 and restricting this content.

The crystal which constitutes the Ni based forged alloy of the present invention desirably has an average grain diameter of 100 μm or less.

A turbine disc made of the Ni based forged alloy of the present invention has a mass of 0.6 tons or more, and a turbine spacer made of the same has a mass of 0.25 tons or more.

The gas turbine of the present invention gives a power of 50 MW or more.

The individual elements contained in the alloy of the present invention will be described hereinafter. The symbol "%" attached to any numerical value representing the proportion of each of the elements denotes "% by mass".

Al: 0.5 to 1.0%

Al is an element which partially forms the γ' phase ($Ni_3Al$), and is an element which takes charge of the strength of the Ni based forged alloy of a γ' phase precipitation strengthening type. Al also has an effect of improving the alloy in an oxidation resistance. If the Al content by percentage is insufficient, the precipitation quantity of the γ' phase by aging is reduced so that the alloy cannot gain a sufficient high-temperature strength. Since the alloy of the present invention contains Ti and Nb as other precipitation strengthening elements in a relatively large proportion, the precipitation strengthening effect is obtained at an Al proportion of from about 0.5%. If the proportion is too large, the appearance of a harmful phase which is hard and brittle is promoted, and the solid solution temperature of the γ' phase rises to lower the alloy in the hot forgeability. Thus, the upper limit is set to 1.0%.

Cr: 17 to 21%

Cr is an element for forming a dense oxide coat made of $Cr_2O_3$ on a surface of any member of the alloy to improve the alloy in an oxidation resistance and a high-temperature corrosion resistance. In order to be used in a high-temperature member which is a target of the present invention, the alloy needs to contain Cr in a proportion of at least 17%. However, if Cr is added thereto in the proportion more than 21%, a σ phase which is a harmful phase is formed to deteriorate the material for the alloy in a ductility and a fracture toughness. Thus, the Cr proportion is set to 21% or less.

Fe: 17 to 19%

Fe is higher in the ductility than Ni, and improves the alloy in a hot workability when added thereto. Fe is more inexpensive than other elements to make costs of the material lower. However, if Fe is excessively added, the γ' phase which is a precipitation strengthening phase becomes unstable to lower the alloy in high-temperature strength. Thus, the proportion of this component is set into the range of 17 to 19%.

Nb: 4.5 to 5.5%

In the same manner as Al and Ti, Nb functions as an element for precipitating the γ' phase to be useful for an improvement in the high-temperature strength. In the present invention, Nb contributes mainly to the γ" phase ($Ni_3Nb$) which has a crystal structure resembling that of the γ' phase closely. The γ" phase functions as a precipitation strengthening phase in the same manner as the γ' phase to improve the material in the high-temperature strength. In order to exhibit this effect, Nb needs to be added in the proportion of 4.5% or more. The γ" phase is phase-transformed into the δ phase by a high-temperature aging, the δ phase being identical in composition with the γ" phase but being different in crystal structure from the γ" phase. Although the δ phase does not have any precipitation strengthening effect, this phase precipitates easily in the crystal boundaries to fulfil a part as pin stoppers in the hot forging or a thermal treatment of the alloy material. Thus, Nb has an effect of restraining the crystal grains from coarsening.

Ti: 0.8 to 1.3%

Ti becomes $Ni_3$ (Al, Ti) in the γ' phase which constitutes a solid solution of the Ni based alloy to contribute to the high-temperature strength. Ti is recognizable to have this effect even when added in a slight proportion. From the viewpoint of an improvement in the macrosegregation property, Ti needs to be added in the proportion of at least 0.8%. If the proportion is too large, an intermetallic compound other than the compound of the γ' phase is produced so that the ductility and the high-temperature workability are damaged. Furthermore, in the same manner as Al, Ti makes the solid solution temperature of the γ' phase high to deteriorate the alloy in the hot forgeability. Thus, the upper limit of the Ti proportion is set to 1.3%.

W: 3.0 to 6.0%

W strengthens the parent phase by a solid-solution strengthening. As the proportion of added W is increased, the macrosegregation property tends to be improved. Thus, W needs to be added in the proportion of at least 3.0%. However, if the proportion is more than 6.0%, the generation of a hard and brittle intermetallic compound phase is promoted and the high temperature forgeability is deteriorated.

B: 0.001 to 0.03%

B has an effect of strengthening the grain boundaries to improve the alloy in creep strength even when added in a very small proportion. However, the addition thereof in an excessive proportion causes the precipitation of a harmful phase, and a partial melting of the alloy based on a fall in the melting point of the alloy. Thus, a proper proportion thereof is set into the range of 0.001 to 0.03%.

C: 0.001 to 0.015%

C is incorporated into the parent phase as a solid solution to improve the alloy in a high-temperature tensile strength, and forms carbides such as MC and $M_{23}C_6$ (in each of which M represents a metal element) to improve the alloy in a grain boundary strength. However, NbC which is a compound of C with Nb is easily oxidized so that an alloy volume increases by the oxidization out of MC species, and an advancing speed of the oxidization from the surface of the alloy is increased. As a result, the surface is cracked. In order to restrain a fall in the fatigue strength by the cracking, the C proportion is favorably made as small as possible. However, unless the proportion is 0.001% or more, the influence of the grain coarsening at the bloom forging time becomes too large so that the alloy may be conversely lowered in the fatigue strength. Thus, the lower limit and the upper limit of the proportion are set to 0.001% and 0.015%, respectively.

The above-mentioned range of the C proportion does not degrade the macrosegregation property.

Mo: 1.0% or less

The influence which Mo gives onto to the strength is similar to that of W to have the effect of strengthening the parent phase by the solid-solution strengthening. Mo improves the alloy in the strength even when added in a slight proportion. This effect is enhanced with an increase in the proportion of added Mo. However, with the increase, the macrosegregation property is largely deteriorated. Thus, the upper limit is set to 1.0%.

The alloy may contain one or more component elements other than the above-mentioned element, such as Co, Mg, Ca, Zr, Mn, Si, V, Ta and/or Re.

Co: 5.0% or less

Co has an effect of improving the alloy in the high-temperature ductility, and may be added thereto in the proportion up to 5.0%. If the proportion is more than 5.0%, the precipitation of a brittle phase is promoted. Mg: 0.1% or less; and Ca: 0.1% or less Mg and Ca may be added to the alloy to decrease the proportion of S which is a harmful element while the alloy is melted. However, according to the addition in an excessive proportion, an inclusion is produced to lower the alloy in the fatigue strength. Thus, the upper limit of the proportion of each of these elements is set to 0.1%.

Zr: 0 to 0.05% or less

Zr segregates in the crystal grain boundaries to produce an effect of heightening the grain boundary strength. However, almost all of Zr bonds to nickel which is the main component of the alloy to produce an intermetallic compound $Ni_3Zr$. This compound lowers the alloy in the ductility, and is remarkably low in a melting point to make a solution treatment of the alloy difficult. Zr produces these harmful effects and other harmful effects. Thus, the upper limit is set to 0.05%, preferably 0.01%.

Si: 0.5% or less; and Mn: 0.5% or less

Si and Mn have a deoxidizing effect to decrease oxygen in the solid solution of the alloy. These elements make the strengthening phases instable to lower the alloy in the strength when excessively added thereto. Thus, the upper limits of both elements are set to 0.5%.

V: 0.50 or less; and Ta: 0.5% or less

V and Ta stabilize the γ' phase and the γ" phase to improve the alloy in the strength. Thus, the addition thereof is permissible. However, the addition in an excessive proportion deteriorates the hot forgeability. Thus, the upper limits of both elements are set to 0.5%.

Re: 0.5% or less

In the same manner as W and Mo, Re is an effective element which is incorporated into the parent phase as the solid solution to strengthen the parent phase by the solid-solution strengthening, and to improve the alloy in the corrosion resistance. However, Re is expensive, and large in a specific gravity to increase the alloy in the specific gravity. Thus, the upper limit is preferably 0.5%, and is more preferably 0.1%.

Component elements described below are inevitable impurities.

O: 0.005% or less; and N: 0.005% or less

O and N are impurities, and are each incorporated into the alloy from a starting material of the alloy. O is incorporated also from a used crucible. These elements are present in the form of lumps as an oxide $Al_2O_3$ and nitrides TiN and AlN in the alloy. If O and N are present in a casting of the alloy, these compounds act as starting points of the cracks while the casting undergoes a creep deformation. Also, these compounds shorten a creep rapture life or induce the generation of a fatigue crack to shorten the fatigue life. As the content by percentage of these elements is smaller, a more favorable result is obtained. However, the content by percentage cannot be adjusted to zero when an actual ingot is produced. Thus, in order not to deteriorate the alloy largely in properties, the upper limit of the proportion of each of the elements is set to 0.005%, and is preferably 0.001%.

P: 0.01% or less; and S: 0.01% or less

P and S are impurities. As the proportion of each of the elements is smaller, a more favorable result is obtained. The proportion of each of the elements needs to be controlled into 0.01% or less.

Hereinafter, working examples of the present invention will be described.

EXAMPLES

Table 1 shows respective chemical compositions of alloys of the present invention (A1 to A3), and conventional alloys of comparative examples (B1 to B3). The unit of each numerical number therein is "% by mass (=mass %)". Table 1 also shows an average grain diameter of carbide grains in each of the examples.

Here, the average grain diameter of the carbide grains is measured in the following way.

1) Profiles of carbide grains in a microscope image are determined by extraction of brightness of the microscope image.

2) Inner areas of the profiles are calculated.

3) The grain diameters of the respective carbide grains are calculated from diameters of circles having areas equivalent to the inner areas.

4) The average grain diameter of the carbide grains is calculated from a hundred or more of the grain diameters of the respective carbide grains.

As the proportion of added C is increased, the average grain diameter of the carbide grains increases. The average grain diameter of the carbide grains of the alloys of the present invention is 20 μm or less.

Figure 2:
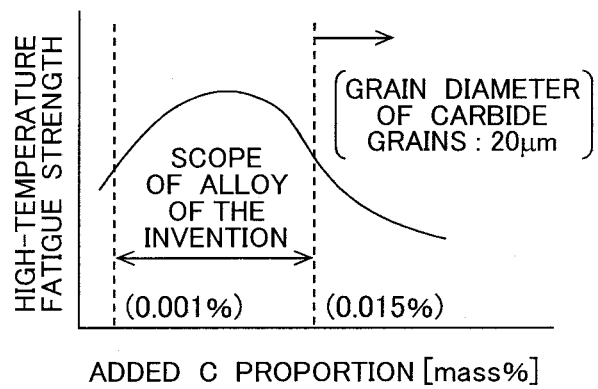
FIG. 2 is a graph showing a relationship between the mass proportion of C added to the alloy, and a high-temperature fatigue strength thereof.

FIG. 1 shows a relationship between the mass proportion of C added to the alloy, and the grain diameter of the carbide grains contained in the alloy. FIG. 2 shows a relationship between the proportion of C added to the alloy, and the high-temperature fatigue strength of the alloy.

As shown in FIG. 1, as the added C proportion is increased, the grain diameter of the carbide grains also tends to increase. When C is added in the proportion of 0.015% or more, the average grain diameter of the carbide grains becomes 20 μm or more.

As shown in FIG. 2, the high-temperature fatigue strength of the alloy has a maximum value in the range of the added C proportion. When C is added in the proportion of 0.015% or more, the high-temperature fatigue strength tends to lower. A reason is as follows: as NbC which is a carbide contained in the alloy becomes more coarse, the carbide grains of NbC are oxidized easily with Fe and Ni contained in the parent metal around the carbide grains. Thus, the oxidization advances up to the depth of the parent metal so that the alloy is easily cracked.

When the C proportion is 0.001% or less, the alloy is not easily cracked so that an influence of C onto the fatigue strength is slight. However, when the material for the alloy is subjected to bloom forging, the carbide functioning as pin stoppers in the grain boundaries is small in quantity so that the crystal grains coarsen remarkably. If the crystal grains turn too coarse, the effect of making the crystal grains fine is not sufficiently obtained by finish-forging of the material, so that the alloy is lowered in the fatigue strength.

Figure 3:
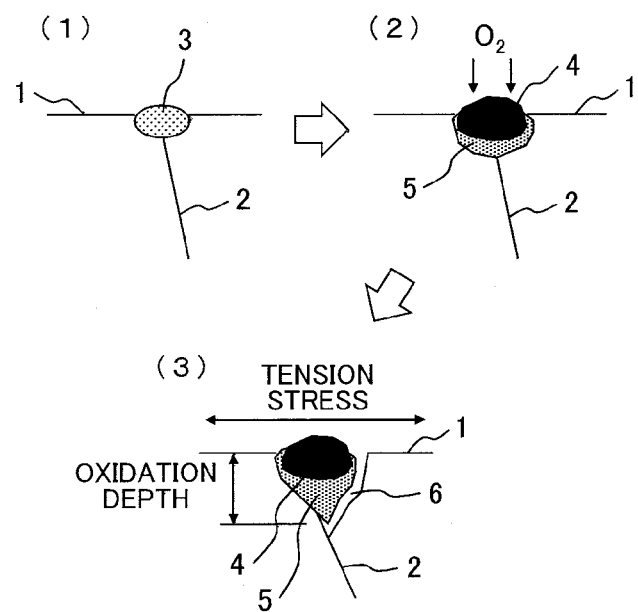
FIG. 3 is a schematic sectional view illustrating a mechanism that a Ni based alloy is cracked by an oxidization of NbC therein.

FIG. 3 illustrates a mechanism that the alloy is cracked by the oxidization of NbC therein.

FIG. 3(1) illustrates an initial state of a surface of the alloy. There is a niobium carbide grain 3 (NbC grain) naked on a surface of a parent metal 1 of the alloy. A crystal grain boundary 2 is present from the niobium carbide grain 3 toward the inside of the parent metal 1.

When the alloy is exposed to an atmospheric air having a high temperature, the oxidization of the NbC grain advances as illustrated in FIG. 3(2), so that an oxidized niobium carbide grain 4 obtained by the oxidization is produced. Following this phenomenon, Fe and Ni contained in the parent metal 1 around the oxidized niobium carbide grain 4 are also oxidized, so that an oxide grain 5 of Fe and/or Ni is formed.

The oxidization advances along the crystal grain boundary 2. When the oxide grain 5 reaches to a predetermined depth, a crack 6 is generated as illustrated in FIG. 3(3). In this case, the depth of the oxidization causing the crack 6 depends on a tension stress applied onto the surface of the parent metal 1.

TABLE 1

| Classification | No. | Alloy composition [mass %] | | | | | | | | | | Average grain diameter [μm] of carbide grains |
|---|---|---|---|---|---|---|---|---|---|---|---|---|
| | | Ni | Al | Cr | Fe | Nb | Ti | W | Mo | B | C | |
| Alloys of the present invention | A1 | Balance | 0.61 | 18.7 | 18.5 | 5.23 | 1.17 | 4.0 | 0.0 | 0.0040 | 0.006 | 6.7 |
| | A2 | Balance | 0.63 | 19.2 | 18.5 | 5.20 | 1.31 | 3.7 | 0.0 | 0.0060 | 0.009 | 11.4 |
| | A3 | Balance | 0.59 | 19.5 | 18.3 | 5.41 | 1.20 | 3.9 | 0.1 | 0.0037 | 0.014 | 17.0 |
| Conventional alloys | B1 | Balance | 0.66 | 19.0 | 18.5 | 5.20 | 1.05 | 4.1 | 0.0 | 0.0043 | 0.031 | 26.4 |
| | B2 | Balance | 0.60 | 20.2 | 19.5 | 5.18 | 1.16 | 4.0 | 0.0 | 0.0046 | 0.040 | 28.1 |
| | B3 | Balance | 0.59 | 18.9 | 18.5 | 5.33 | 1.10 | 5.0 | 0.0 | 0.0043 | 0.028 | 23.3 |

Figure 4:
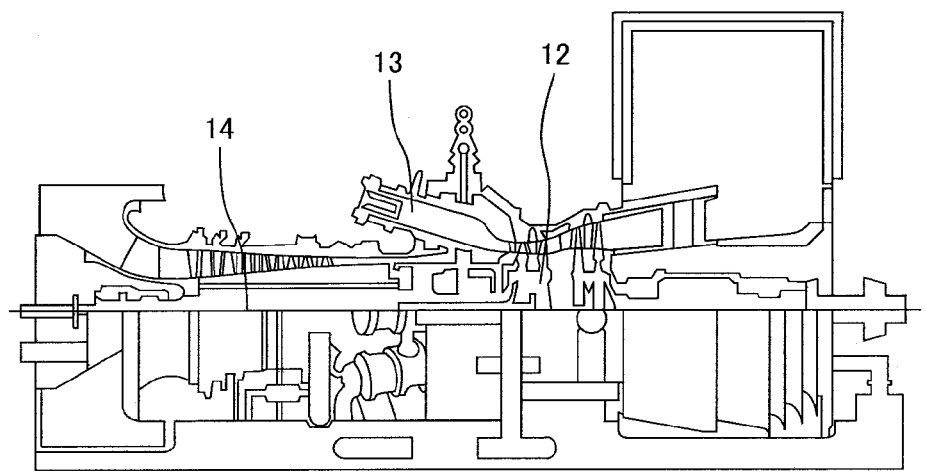
FIG. 4 is a partial sectional view illustrating an external appearance of a gas turbine and the inside thereof.

FIG. 4 illustrates an external appearance and the inside of a gas turbine produced from a Ni based forged alloy containing the above-mentioned essential constituent elements (Ni, Al, Cr, Fe, Nb, Ti, W, B, C and Mo).

The gas turbine is composed mainly of three members of turbine discs 12, a combustor 13, and a compressor 14. Air is compressed in the compressor 14, and the air and a fuel are mixed with each other in the combustor 13 to combust the fuel, thereby generating a high-temperature and high-pressure combustion gas. The gas is blown onto turbine blades to rotate the turbine discs 12. At a rotary region of the turbine where the combustion gas flows at a high speed, the turbine blades and nozzles are alternately arranged. The turbine blades are fitted to the turbine discs 12 which are a rotary axis. The turbine discs 12 are fixed onto each other through turbine spacers and turbine stacking bolts.

Figure 5:
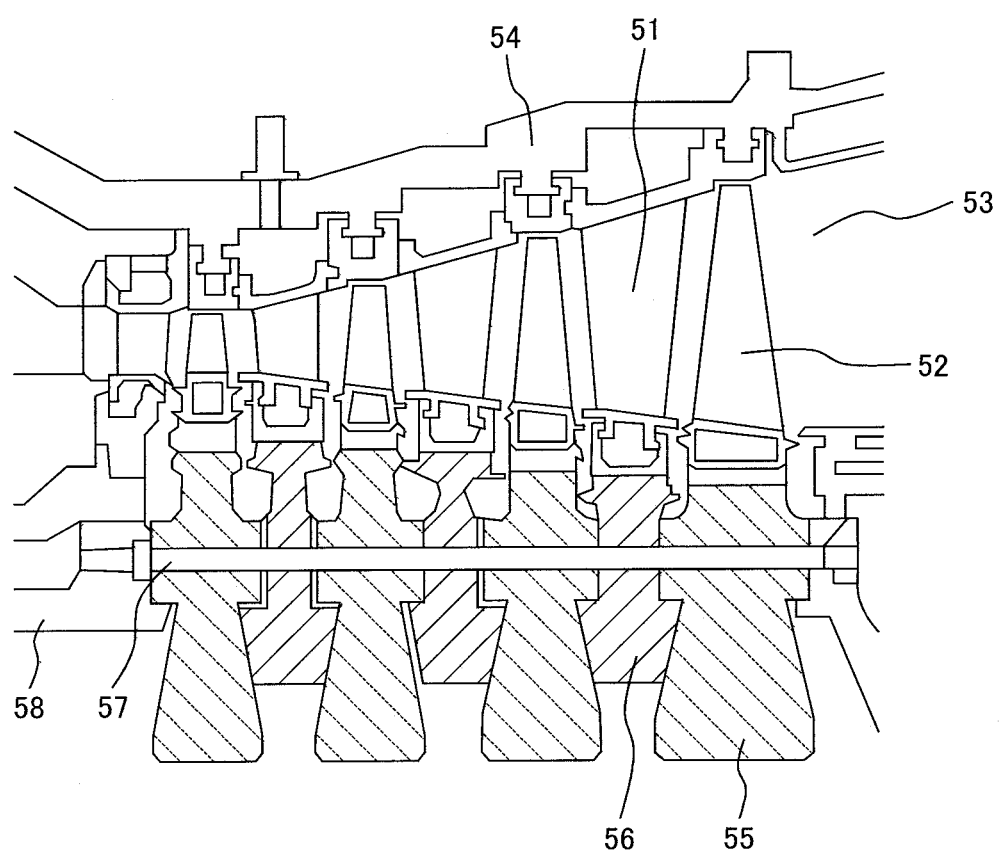
FIG. 5 is an enlarged partial sectional view illustrating a high-temperature rotary region of a gas turbine.

FIG. 5 illustrates a cross section of a high-temperature rotary region of a gas turbine.

In FIG. 5, inside a casing 54 of the gas turbine, turbine nozzles 51, turbine blades 52 and an intermediate axis 58 are located. Gaps between the turbine nozzles 51 and the turbine blades 52 constitute a gas path 53. Turbine discs 55 and turbine spacers 56 are fixed to the intermediate axis 58 through stacking bolts 57.

Out of members of a gas turbine, turbine discs and turbine spacers are members required to have a high-temperature strength and used as large-sized forged members. It is difficult for alloy 718 and any other conventional metal to be made large-sized. Thus, it is difficult for these metals to be used for large-sized turbine discs. Instead of these metals, it is necessary to use a metal that can be manufactured into large-sized ingots but is low in an endurable temperature. This matter hinders an improvement in the efficiency of gas turbines.

The alloy of the present invention is high in the endurable temperature, and is a material that can be manufactured into large-sized forged members sufficient for the production of gas turbine discs. Thus, the alloy makes it possible to produce large-sized gas turbines each giving a power of 80 MW or more. The alloy also makes it possible to realize a high-efficiency thermal power generation plant using these large-sized gas turbines.

What is claimed is:

1. A turbine disc including the Ni based forged alloy having a composition containing, on the basis of mass percent:
    Al: 0.5 to 1.0%, Cr: 17 to 21%, Fe: 17 to 19%, Nb: 4.5 to 5.5%, Ti: 0.8 to 1.3%, W: 3.0 to 6.0%, B: 0.001 to 0.03%, C: 0.001 to 0.015%, and Mo: 1.0% or less, the balance being Ni and inevitable impurities,
    the alloy including carbide grains of the contained elements,
    wherein the carbide grains have an average grain diameter of 20 μm or less; and
    the turbine disc having a mass of 0.6 ton or more.

2. A turbine spacer including the Ni based forged alloy having a composition containing, on the basis of mass percent:
    Al: 0.5 to 1.0%, Cr: 17 to 21%, Fe: 17 to 19%, Nb: 4.5 to 5.5%, Ti: 0.8 to 1.3%, W: 3.0 to 6.0%, B: 0.001 to 0.03%, C: 0.001 to 0.015%, and Mo: 1.0% or less, the balance being Ni and inevitable impurities,
    the alloy including carbide grains of the contained elements,
    wherein the carbide grains have an average grain diameter of 20 μm or less; and
    the turbine spacer having a mass of 0.25 ton or more.

3. A gas turbine including a turbine disc and/or turbine spacer including the Ni based forged alloy having a composition containing, on the basis of mass percent:
    Al: 0.5 to 1.0%, Cr: 17 to 21%, Fe: 17 to 19%, Nb: 4.5 to 5.5%, Ti: 0.8 to 1.3%, W: 3.0 to 6.0%, B: 0.001 to 0.03%, C: 0.001 to 0.015%, and Mo: 1.0% or less, the balance being Ni and inevitable impurities,
    the alloy including carbide grains of the contained elements,
    wherein the carbide grains have an average grain diameter of 20 μm or less; and
    the gas turbine giving a power of 50 MW or more.

4. The gas turbine according to claim 3,
    wherein the turbine disc has a mass of 0.6 ton or more and/or the turbine spacer has a mass of 0.25 ton or more.

* * * * *